Aug. 20, 1929. D. GERHARDT 1,725,628
STOCK WATERING TANK
Original Filed March 28, 1927 2 Sheets-Sheet 1

David Gerhardt
INVENTOR
BY Victor J. Evans
ATTORNEY

Aug. 20, 1929.  D. GERHARDT  1,725,628
STOCK WATERING TANK
Original Filed March 28, 1927    2 Sheets-Sheet 2

David Gerhardt
INVENTOR
BY Victor J. Evans
ATTORNEY

Patented Aug. 20, 1929.

1,725,628

UNITED STATES PATENT OFFICE.

DAVID GERHARDT, OF NEW BERLIN, ILLINOIS.

STOCK-WATERING TANK.

Application filed March 28, 1927, Serial No. 179,034. Renewed January 18, 1929.

This invention relates to stock watering troughs and has for an object the provision of a number of separate troughs which may be automatically supplied with water from a common tank or reservoir, and thus accommodate a number of animals.

Another object of the invention is the provision of means for preventing the introduction of foreign matter into the troughs and also preventing the animals from entering said troughs, so that the water may be kept in a sanitary condition.

Another object of the invention is the provision of a novel construction and arrangement of valve mechanism for controlling the supply of water to the tanks, whereby the valve mechanism will be easily accessible and may be readily removed and replaced when necessary.

With the above and other objects in view, the invention further includes the following novel features and details of construction, to be hereinafter more fully described, illustrated in the accompanying drawings and pointed out in the appended claim.

In the drawings:—

Figure 1:
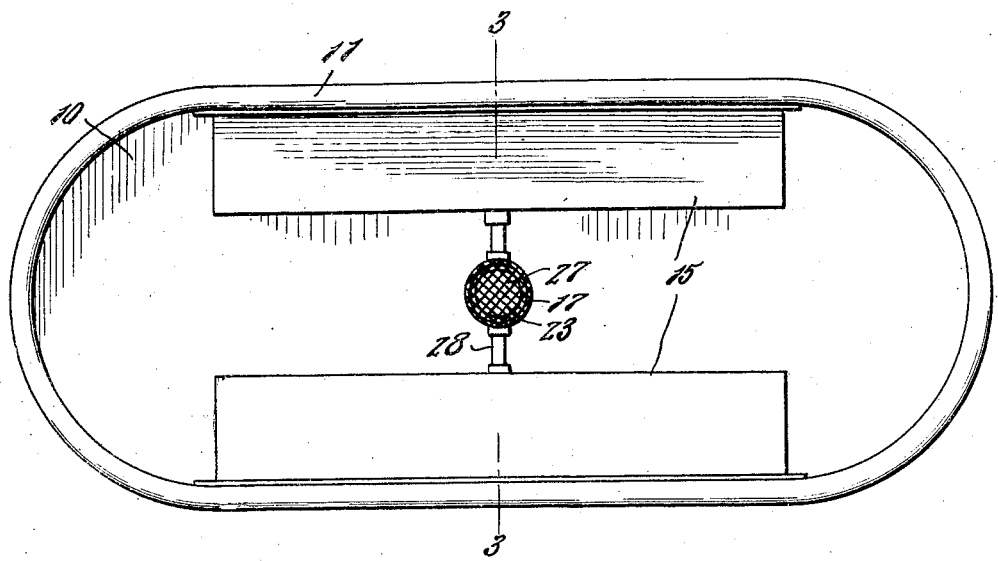
Figure 1 is a plan view of a stock watering trough constructed in accordance with the invention.
Figure 2:
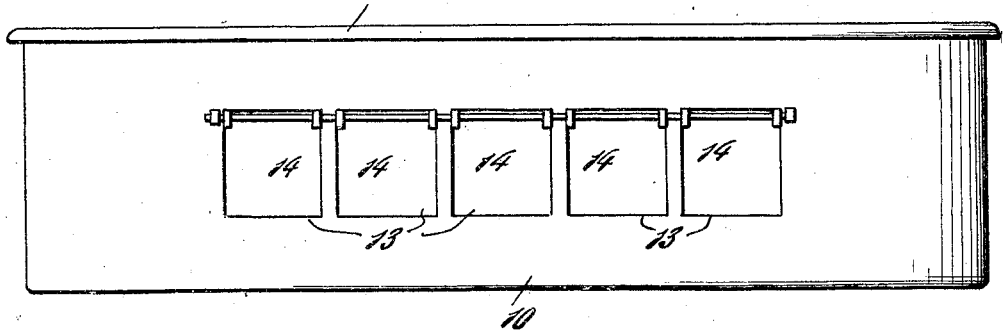
Figure 2 is a side view of the same.
Figure 5:
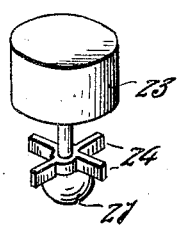
Figure 5 is a detail perspective view of the float valve.
Figure 3:
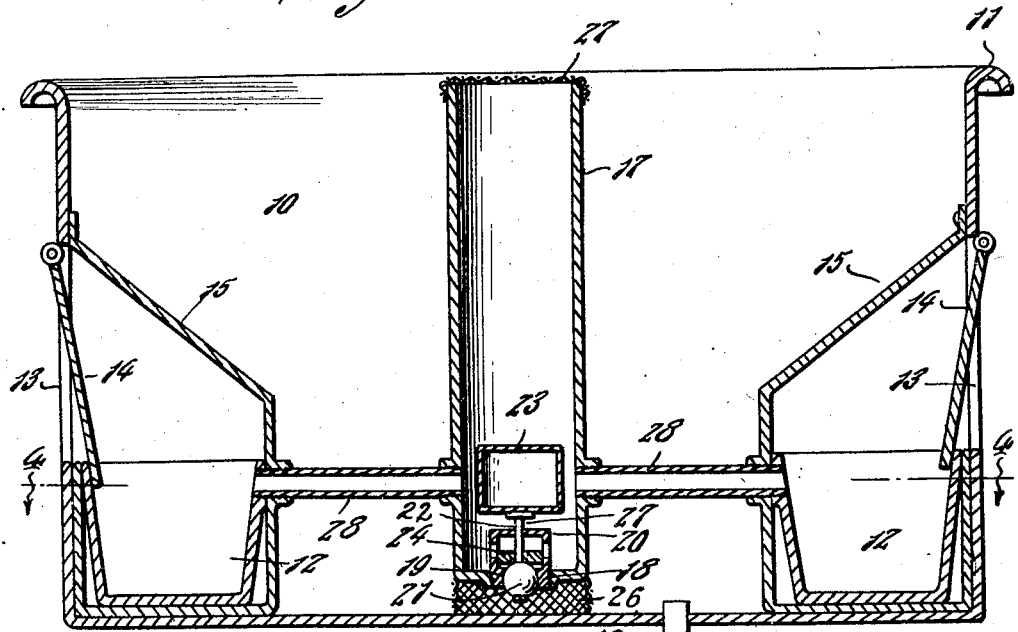
Figure 3 is an enlarged section on the line 3—3 of Figure 1.
Figure 4:
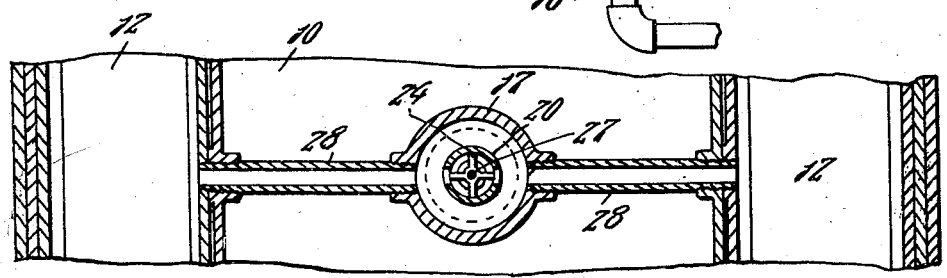
Figure 4 is a fragmentary horizontal section on the line 4—4 of Figure 3.

Referring to the drawings in detail wherein like characters of reference denote corresponding parts, the tank or reservoir which is designed to hold a supply of water, may be of any suitable size or shape. In Figures 1 to 3 of the drawings, the tank is of elongated form as shown at 10 and its opposite ends are preferably rounded, while its upper edge is provided with a rolled flange 11.

Arranged upon opposite sides of the tank are troughs 12 and the adjacent walls of the tank are provided with openings 13 located above the upper edges of the troughs 12. These openings are preferably spaced apart and are normally closed by inwardly opening gravity doors 14. The stock are thus separated from one another when drinking and the doors 14 keep the unused openings in closed condition. For some types of animals, these doors may be dispensed with. Each of the troughs 12 is arranged within a housing 15 so that the troughs are protected from foreign matter, and as it is not possible for the animals to enter the troughs, the water will be kept in a sanitary condition.

The tank or reservoir is supplied with water from a suitable source through a pipe 16 and this pipe may be provided with a controlling valve, so that the tank may be filled and the controlling valve closed until the supply of water within the tank has been reduced.

Arranged within the tank 10 is a well 17. This well is spaced from the bottom of the tank and is provided with an opening 18 within which is positioned a valve seat 19. The seat 19 is formed in the bottom of a cage 20, which is threadedly secured within the opening 18. A valve member 21 is adapted to engage the seat to control the passage of water into the well from the tank 10, while extending from the valve member is a stem 22. This stem is guided in the cage 20 and carries a float 23, by means of which the valve member is operated to regulate the admission of water into the well. Radially extending arms 24 carried by the valve member assist in guiding the latter.

The bottom of the well 17 has extending therefrom a removable screen 26, while the top of the well has mounted thereon a removable screen 27, so that access may be had to the valve 21 through the top of the well, while foreign matter will be prevented from entering the well.

Communication between the well 17 and the troughs 12 is provided by means of distributor pipes 28.

Figure 6:
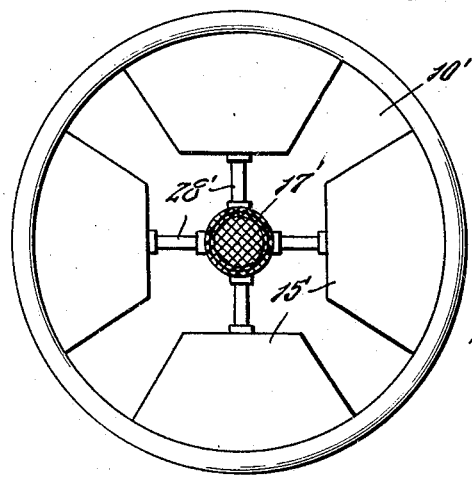
Figure 6 is a plan view showing a slightly modified form of the invention.

In Figure 6 of the drawings, the tank or reservoir which is indicated at 10', is of circular form, while the troughs are arranged within separate housings 15' spaced around the inner wall of the tank. The wall 17' is provided with diametrically opposite distributor pipes 28'. Of course, if desired, the troughs within the tank 10' may be circular in form and in this event, the housing 15' will be of like construction.

The invention is susceptible of various changes in its form, proportions and minor details of construction and the right is herein reserved to make such changes as properly fall within the scope of the appended claim.

Having described the invention what is claimed is:—

A stock watering trough comprising a tank having openings therein, troughs within the tank adjacent said openings, housings dividing the troughs from the interior of the tank, a well within the tank, distributor pipes establishing communication between the well and each of the troughs, said well having an inlet opening therein, a valve cage removably secured within the opening and having a valve seat, a valve member within the cage for engagement with the seat, a float operating within the well and connected to the valve member to control the latter and regulate the feed of water to the troughs, and means to secure the cage in position to hold the parts assembled.

In testimony whereof I affix my signature.

DAVID GERHARDT.